June 2, 1942.　　W. G. EATON　　2,285,113
MUDDLING OR DUNKING DEVICE
Filed Oct. 14, 1938
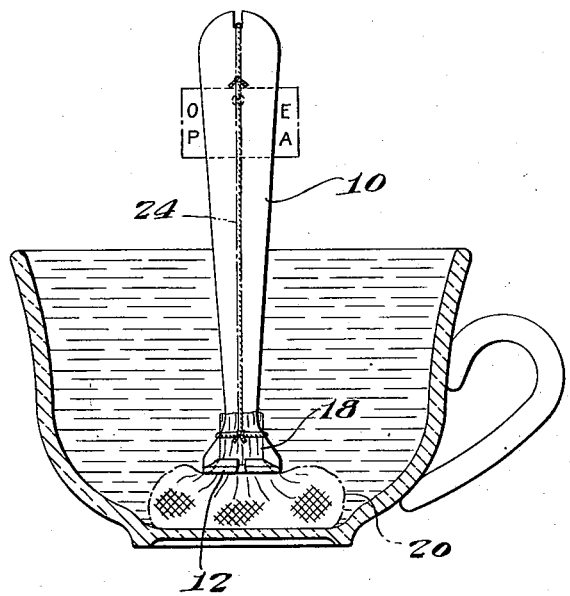
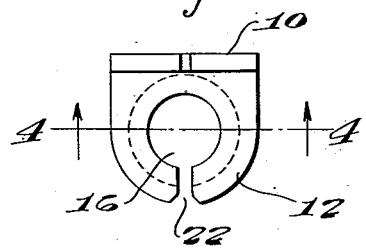
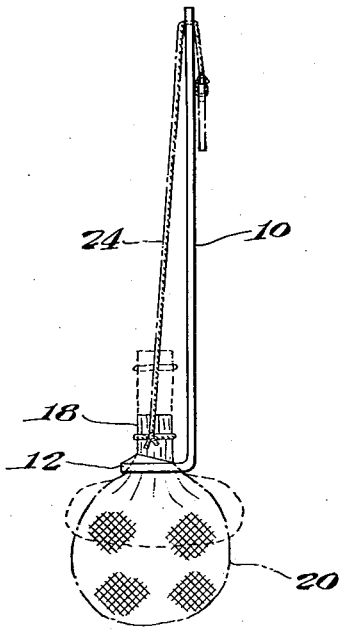
Inventor
William G. Eaton Patented June 2, 1942

2,285,113

UNITED STATES PATENT OFFICE 2,285,113

MUDDLING OR DUNKING DEVICE

William G. Eaton, Hull, Mass.

Application October 14, 1938, Serial No. 235,030

3 Claims. (Cl. 100—49)

This invention relates to a device for muddling or dunking a tea bag, coffee bag or the like.

One object of the invention is to provide a novel muddling device which is particularly useful in assisting in the extraction of tea from a tea bag.

A further object of the invention is to provide a novel device which enables more efficient extraction of the tea or coffee from a tea or coffee bag during and after normal use of the same and and which in addition serves as an efficient holding device to facilitate the disposition and handling of the tea or coffee bag after it has been used.

With these general objects in view and such others as may hereinafter appear, the invention consists in the muddling or holding device for tea, coffee, and similar bags hereinafter described and particularly defined in the claims at the end of this specification.

In the drawing illustrating the preferred embodiment of the invention, Fig. 1 is a sectional view illustrating the use of the present muddling device as a dunker during the process of brewing a cup of tea with a tea bag; Fig. 2 is a side elevation of the muddling device with the tea bag in the position in which it assumes after the cup of tea has been brewed in the normal manner and preparatory to squeezing the excess tea liquor from the tea bag; Fig. 3 is a plan view of the tea bag muddling device shown in Figs. 1 and 2; and Fig. 4 is a cross sectional view taken on the line 4—4 of Fig. 3.

As is well known, each of the various forms of tea or coffee bags now upon the market comprises a perforate bag usually made of gauze or paper containing a quantity of the tea or coffee and having the mouth of the bag closed to retain the tea or coffee therein and connected by a length of string to a tag. During the operation of brewing a cup of tea, in accordance with the usual practice, the tea bag is immersed in the hot water, usually with the string extended over the lip of the cup and the tag hanging down over the outside of the cup. In order to assist in the extraction of the tea liquor from the tea, it has become more or less the practice to raise and lower the tea bag in the hot water, the tag serving as a handle which is grasped in the hand. It has been a common experience that at times the bag slips from the fingers and falls into the tea and in many instances the water has become cooled to sufficient extent to detract from the efficient extraction of the tea before the brewing of the cup of tea has been completed. Usually the tags have been printed in color or the paper of which they are made contains pigments and the occasional immersion of the tag in the tea contaminates the tea and in some instances actually constitutes a menace to the health of the consumer. It has also been the practice by the user to attempt to hasten the extraction process by squeezing the tea ball with a silver spoon and this practice is inconvenient and none too successful.

In one of its aspects, the present invention contemplates a useful instrument for dunking a tea ball during the extraction process whereby to increase the efficiency of the extraction and enabling the cup of tea to be brewed more rapidly and before the water within the cup has become cool. Accordingly the invention contemplates a handle 10 which may be of any suitable material of sufficient rigidity to enable the device to function as a muddler and in practice I prefer to construct it of metal such as a silver plated brass or other composition or it may be made of glass or other suitable material. The handle 10 is provided at one end with an annular portion 12 whose under surface 14 is of a generally tapered shape for a purpose to be described and the opening 16 therein is of sufficient diameter to permit the mouth 18 of the tea ball 20 to be drawn upwardly therethrough being guided by the tapered under surface of such annular portion. The annular member 12 is preferably of less size than the diameter of the usual tea bag 20 and is provided with a passageway or slot 22 through which the string 24 of the tea bag 20 may be readily passed prior to the drawing up of the mouth of the tea bag through the annular opening 16 and at the same time the slot 22 is sufficiently narrow so that the material of the tea bag does not extend into the slot when the bag is drawn upwardly therethrough.

In the use of the device as thus far described the tea bag may be inserted into the boiling or hot water within the cup in the usual manner and permitted to remain there until a substantial amount of extraction has taken place. Thereafter the operator grasping the handle of the tea bag may conveniently thread the string 24 of the tea bag through the slot 22 and by an upward motion readily draw the mouth of the tea bag up through the opening 16 in the annular member 12 of the device, such position being shown in Fig. 2. The device may then be used to dunk the tea ball against the bottom of the cup or tea pot or other container to thereby force the water through all of the tea within the bag and obtaining extraction in a most efficient and rapid manner. Continued vertical dunking motion enables the remaining portion of the extraction to be accomplished in a minimum time.

After the extraction has been completed in the manner described, the tea bag and dunker may then be removed from the tea pot, cup or other container and the remaining juices may be squeezed from the tea bag into the tea pot or cup thus eliminating the excessive liquid remaining therein and enabling the juices to be recovered by continued drawing of the mouth portion of the bag up through the opening of the annular member in a position illustrated in dotted lines in Fig. 2. The muddler and tea bag may then be placed in the saucer in a fairly dry condition. In order to facilitate retention of the tea bag the upper portion of the handle may be provided with a slot or other retaining device to enable the string to be drawn therethrough and this enables the device with the tea bag in the position shown in dotted lines in Fig. 2 to be ready placed in the saucer and the tea bag retained readily for further use when desired. The handle 10 of the device may conveniently bear advertising matter, such as the brand of tea.

While the present device finds particular use with tea bags, nevertheless, it may also be used with advantage with coffee bags and with other bags containing material from which extractions are to be made.

Having thus described the invention, what is claimed is:

1. As a new article of manufacture, a muddling device for a pouch type tea, coffee or similar bag having a string attached thereto comprising a substantially rigid elongated handle formed from a single piece of material, said handle having its lower end bent at substantially right angles thereto to form a bag engaging portion provided with a circular opening through which the closed mouth of the bag may be drawn upwardly by said string, said bag engaging portion being provided with a relatively narrow slot communicating with said circular opening for convenience in threading the string through said opening preparatory to drawing the closed mouth of the bag therethrough, said relatively narrow slot being of less width than the contracted neck portion of the bag.

2. As a new article of manufacture, a muddling device for a pouch type tea, coffee or similar bag having a string attached thereto comprising a substantially rigid elongated handle formed from a single piece of material, said handle having its lower end bent at substantially right angles thereto to form a bag engaging portion provided with a circular opening through which the closed mouth of the bag may be drawn upwardly by said string, said bag engaging portion being provided with a relatively narrow slot communicating with said circular opening for convenience in threading the string through said opening preparatory to drawing the closed mouth of the bag therethrough, said relatively narrow slot being of less width than the contracted neck portion of the bag, the upper end of the handle being provided with an open slot through which the other end of the string is arranged to be received.

3. As a new article of manufacture, a muddling device for a pouch type tea, coffee or similar bag having a string attached thereto comprising a substantially rigid elongated handle formed from a single piece of material, said handle having its lower end bent at substantially right angles thereto to form a bag engaging portion provided with a circular opening through which the closed mouth of the bag may be drawn upwardly by said string, said bag engaging portion being provided with a relatively narrow slot communicating with said circular opening for convenience in threading the string through said opening preparatory to drawing the closed mouth of the bag therethrough, said relatively narrow slot being of less width than the contracted neck portion of the bag, the walls of said circular opening tapering upwardly to guide the neck of the bag therethrough and arranged to substantially embrace the top of the bag.

WILLIAM G. EATON.